United States Patent [19]

Ernst

[11] Patent Number: 4,581,826

[45] Date of Patent: Apr. 15, 1986

[54] SENSING PIN MOUNTING ARRANGEMENT FOR MULTICOORDINATE SENSING HEAD

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 522,400

[22] Filed: Aug. 11, 1983

[30] Foreign Application Priority Data

Aug. 21, 1982 [DE] Fed. Rep. of Germany ....... 3231160

[51] Int. Cl.⁴ .............................................. G01B 7/28
[52] U.S. Cl. .................................... 33/169 R; 33/558; 33/561
[58] Field of Search ................. 33/169, 172 R, 172 L, 33/174 L, 23 K, 558, 561; 409/126–129; 251/3

[56] References Cited

U.S. PATENT DOCUMENTS

| | | | |
|---|---|---|---|
| 4,203,225 | 5/1980 | Nilsson | 33/169 R |
| 4,270,275 | 6/1981 | McMurtry | 33/172 E X |
| 4,279,080 | 7/1981 | Nakaya | 33/169 R X |
| 4,288,925 | 9/1981 | McMurtry | 33/172 E X |
| 4,443,946 | 4/1984 | McMurtry | 33/169 R X |

FOREIGN PATENT DOCUMENTS

| | | |
|---|---|---|
| PS1028792 | 5/1959 | Fed. Rep. of Germany . |
| OS1548326 | 7/1970 | Fed. Rep. of Germany . |
| PS2242355 | 10/1974 | Fed. Rep. of Germany . |
| 2742817 | 4/1978 | Fed. Rep. of Germany .... 33/174 L |
| PS2804398 | 12/1979 | Fed. Rep. of Germany . |
| 0141569 | 5/1980 | Fed. Rep. of Germany .... 33/169 R |
| AS1932010 | 6/1980 | Fed. Rep. of Germany . |
| PS2712181 | 1/1981 | Fed. Rep. of Germany . |
| PCT/SU79/-00124 | 12/1979 | PCT Int'l Appl. . |
| 1599758 | 10/1981 | United Kingdom . |

*Primary Examiner*—Harry N. Haroian
*Attorney, Agent, or Firm*—Willian Brinks Olds Hofer Gilson & Lione Ltd.

[57] ABSTRACT

A multicoordinate sensing head is disclosed in which a sensing pin is secured in the interior of a sensing head housing by means of a flange which is rigidly secured to the pin. The flange rests on precisely formed bearing balls which are distributed uniformly around the circumference of an opening in the bottom of the housing through which the pin passes. A rim on the flange extends around the bearing balls to grip the balls and prevent radial shifting of the sensing pin. In the rest position, into which the sensing pin is pressed by the action of the spring operating via a sensor probe, the free end of the sensing pin is precisely positioned in a predetermined orientation with respect to the housing in a repeatable and accurate manner. When the sensing pin is deflected, the flange tilts around one or two of the balls and thereby moves the sensor probe axially to allow a measurement system to sense deflection of the sensing pin.

4 Claims, 1 Drawing Figure

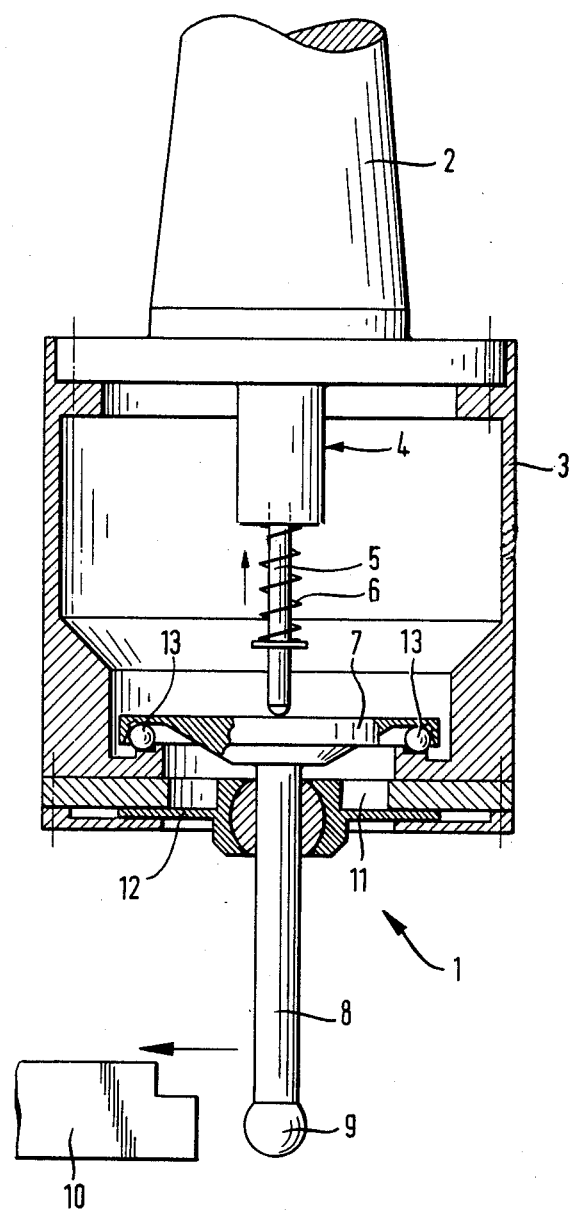

SENSING PIN MOUNTING ARRANGEMENT FOR MULTICOORDINATE SENSING HEAD

BACKGROUND OF THE INVENTION

The present invention is directed to an arrangement for mounting a sensing pin in a multicoordinate sensing head of the type which includes a casing which defines an opening through which the sensing pin extends, and means for detecting deflection of the sensing pin with respect to the housing.

A wide variety of sensing heads are known which are typically used in conjunction with multicoordinate measuring or processing machines. Thus, for example, German patent DE-PS No. 28 04 398 describes a sensing head which is bias tensioned by means of friction springs, such that the sensing arm remains in its rest position until a previously determined limit value is exceeded. In FIG. 5 of this patent there is shown a swinging bearing for a sensing head which includes annularly arranged ball bearing elements which cooperate with cylindrical bearing elements to bring about a positive angular positioning of the sensing head housing in the manner of a lenticulation.

Furthermore, in publication No. WO81/01876 of PCT application No. PCT/SU79/00134 of Dec. 26, 1979, a sensing head is shown which functions according to the resonance-contact principle. In this sensing head, a sensing pin is provided which is angularly movable with respect to a housing, and the sensing pin includes a flange which defines a rim which abuts the bottom of the sensing pin housing around the sensing pin opening. On the upper side of the flange, opposed to the free end of the sensing pin, there is mounted a piezoelectric converter which operates to set the sensing pin in vibration. On contact between the sensing pin and the workpiece, the resonant frequency of the pin changes, and this change is evaluated by a switching circuit.

German patent DE-PS No. 27 12 181 discloses a sensing head which registers the deflection of the sensing pin with tension-sensitive or pressure-sensitive elements.

British Pat. No. 1,599,758 discloses a sensing head which utilizes an elastomeric bellows to seal off the opening between the sensing pin and the sensing head housing through which the sensing pin emerges from the housing.

SUMMARY OF THE INVENTION

The present invention is directed to an improved mounting arrangement for a sensing pin which can be constructed in a manner which is mechanically simple, which provides good reproduceability of the sensing pin deflection signal, which is economically manufacturable, and which is relatively insensitive to rough treatment in operation. It is an object of this invention to provide such a mounting arrangement which eliminates unnecessary complexities of certain prior art arrangements and which improves the reproduceability with which the sensing pin is restored to a predetermined position with respect to certain prior art arrangements.

According to this invention, a multicoordinate sensing head of the type described initially above is provided with a flange which is secured to the pin within the housing. An array of bearing balls is mounted to the housing around the opening and means are provided in the flange for engaging the bearing balls to orient the flange and therefore the pin in a predetermined position. A sensor probe is included in the detecting means to engage a central portion of the flange.

The mounting arrangement of the present invention provides a particularly uncomplicated and therefore economical construction in which, to the greatest possible extent, commonly used, commercially available components are used, yet which provides a sturdiness of construction and high accuracy of repetition in the triggering of the sensing pin deflection signal.

The invention itself, together with further objects and attendant advantages, will best be understood by reference to the following detailed description, taken in conjunction with the accompanying drawing.

BRIEF DESCRIPTION OF THE DRAWING

The drawing is a cross-sectional view of a sensing head which incorporates a presently preferred embodiment of the mounting arrangement of this invention.

DETAILED DESCRIPTION OF THE PRESENTLY PREFERRED EMBODIMENT

The accompanying drawing shows a cross-sectional view of a sensing head 1 which includes a clamping mandrel 2 used for mounting the sensing head 1 in the spindle of a measuring or processing machine (not shown). The sensing head 1 includes a sensing head housing 3 which serves to enclose a measuring system 4. This measuring system 4 includes a sensor probe 5 which is axially movable along a direction aligned with the center line of the mandrel 2. The sensing head 1 includes a sensing pin 8 which terminates at its free end in a sensing or contacting ball 9 for the sensing of a workpiece 10. The other end of the sensing pin 8 terminates in a flange 7 which is rigidly secured to the sensing pin 8. The sensor probe 5 is biased against a central portion of the flange 7 by means of a coil spring 6. The sensing head housing 3 defines a sensing pin opening 11, through which the free end of the sensing pin 8 extends from the housing 3. This sensing pin opening 11 is provided with a covering 12 which protects the interior of the housing 3 from external influences.

The sensing pin 8 is mounted so as to be tiltable in any direction away from the rest position shown in the figure. A plurality of bearing balls 13 are disposed around the opening 11 in a symmetrical, circular array. These balls 13 are distributed uniformly around the circumference of the opening 11, and are secured to the housing 3 in a suitable manner, as for example by means of a cement. The balls 13 are economical components and can be for example standard bearing balls having a high surface quality and excellent hardness characteristics. The underside of the flange 7 defines a circular recess sized to receive and bear against the balls 13. Preferably, the balls are fastened or cemented in such a manner that they lie without play on the flange 7. When the contacting ball 9 is deflected in the sensing of the workpiece 10, the flange 7 tilts and rolls off over one or two of the balls 13. Thus, the balls provide pivot axes for the pin 8. Because the balls are positioned to contact the flange 7 in a play-free manner, the biasing action of the spring 6 operates to assure an exact and repeatable zero or rest position of the contacting ball 9 at the end of the sensing pin 8. Thus, a reproduceable zero position of the contacing ball 9 is obtained in a particularly simple and straight-forward manner through the use of standard, commercially available components. The sensor probe which engages the center of the flange 7 is moved axially when the flange 7 tilts. The axial movement of the sensor probe 5 acts on the measuring system 4. The measuring system 4 can be of any standard construction, and it operates to generate a signal which can either indicate deflection of the sensing pin 8 by means of an impulse, or else indicate the extent of the sensing pin deflection by means of a proportional measurement value.

Of course, it should be understood that a range of changes and modifications to the preferred embodiment described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a multicoordinate sensing head comprising a housing which defines an opening, a sensing pin which passes through the opening and is deflectable in several directions, and means for detecting deflection of the sensing pin, the improvement comprising:
   a flange secured to the pin without the housing;
   an array of bearing balls, each mounted directly to the housing in a circular array around the opening, said circular array being concentric with a central axis defined by the pin;
   a surface defined by an integral part of the flange and positioned to bear directly against and engage each of the bearing balls to orient the flange and therefore the pin in a predetermined position; and
   a sensor probe, included in the detecting means, which engages a central portion of the flange;
   wherein the surface defines a circular recess in the flange, said recess positioned and shaped to receive the bearing balls.

2. The invention of claim 1 wherein the bearing balls are cemented to the housing.

3. The invention of claim 1 wherein the engaging means defines a surface of revolution concentric with the central axis and positioned to engage the bearing balls symmetrically to substantially eliminate preferential tilting directions of the pin.

4. In a multicoordinate sensing head comprising a casing which defines an opening, a sensing pin which passes through the opening and defines a first end outside the housing and a second end within the housing, and means for detecting deflection of the sensing pin, the improvement comprising:
   a circular flange rigidly secured to the second end of the pin within the housing, said flange defining a circular recess on a portion of the flange oriented toward the opening said circular recess defining a surface of revolution centered about an axis;
   a circular array of bearing balls cemented in place to the housing, symmetrically disposed around the opening and the axis to fit within the recess and bear on the surface of revolution in order to define a predetermined orientation of the first end of the pin with respect to the housing;
   a sensor probe, included in the detecting means, which engages a central portion of the flange; and
   a spring mounted in the housing to bias the flange into engagement with the bearing balls and the first end of the pin into the predetermined orientation, while accommodating tilting of the pin and flange about at least one of the bearing balls in response to forces applied to the first end of the pin, said surface of revolution and bearing balls cooperating to substantially eliminate preferential tilting directions of the pin.

* * * * *

UNITED STATES PATENT AND TRADEMARK OFFICE
CERTIFICATE OF CORRECTION

PATENT NO. : 4,581,826
DATED : April 15, 1986
INVENTOR(S) : Alfons Ernst

It is certified that error appears in the above-identified patent and that said Letters Patent is hereby corrected as shown below:

IN THE CLAIMS

In Claim 1 (column 3, line 28), please delete "without" and substitute therefor --within--;

In Claim 1 (column 3, line 36), please delete the word "and";

In Claim 1 (column 3, line 38), after "flange;" please add the word --and--;

In Claim 3 (column 4, lines 6-7), please delete "engaging means" and substitute therefor --surface--;

In Claim 4 (column 4, line 22), after "bearing balls" please insert --, each--;

In Claim 4 (column 4, line 22) after "in place" please insert --directly--;

In Claim 4 (column 4, line 24), please insert a comma after "recess";

UNITED STATES PATENT AND TRADEMARK OFFICE
CERTIFICATE OF CORRECTION

PATENT NO. : 4,581,826
DATED : April 15, 1986
INVENTOR(S) : Alfons Ernst

It is certified that error appears in the above-identified patent and that said Letters Patent is hereby corrected as shown below:

In Claim 4 (column 4, line 25), please delete "bear" and substitute therefor --bearing--.

Signed and Sealed this

Nineteenth Day of April, 1988

Attest:

DONALD J. QUIGG

*Attesting Officer*  *Commissioner of Patents and Trademarks*